United States Patent [19]

Newmeyer

[11] 4,012,747

[45] Mar. 15, 1977

[54] DOUBLE REVOLVING STYLUS ON CONTINUOUS BELT

[75] Inventor: Reed Albert Newmeyer, Midvale, Utah

[73] Assignee: Sperry Rand Corporation, New York, N.Y.

[22] Filed: Dec. 10, 1975

[21] Appl. No.: 639,570

[52] U.S. Cl. ........................ 346/139 A; 346/139 C

[51] Int. Cl.$^2$ ........................................ G01D 15/24

[58] Field of Search ....... 346/139 A, 139 C, 139 R, 346/74 E, 74 ES

[56] References Cited

UNITED STATES PATENTS

| | | | |
|---|---|---|---|
| 3,166,752 | 1/1965 | Waterman | 346/139 A X |
| 3,380,070 | 4/1968 | Betts et al. | 346/139 C X |
| 3,810,189 | 5/1974 | Casperson et al. | 346/139 C X |

*Primary Examiner*—Joseph W. Hartary
*Attorney, Agent, or Firm*—Thomas J. Nikolai; Kenneth T. Grace; Marshall M. Truex

[57] ABSTRACT

A printer comprising a stylus carrige having at least two stylii disposed on a continuously driven belt transporting each stylus in turn across a print medium. The belt is made of any flexible insulating material and has a plurality of conductive strips disposed thereon. Each stylus comprises a plurality of wires, one end of which forms a writing tip with each of the wires at the other end individually connected electrically to one of said conductive strips. Motor driven commutator means drive the belt and provide the conductive paths for energizing individual wires in accordance with the data to be printed.

8 Claims, 7 Drawing Figures

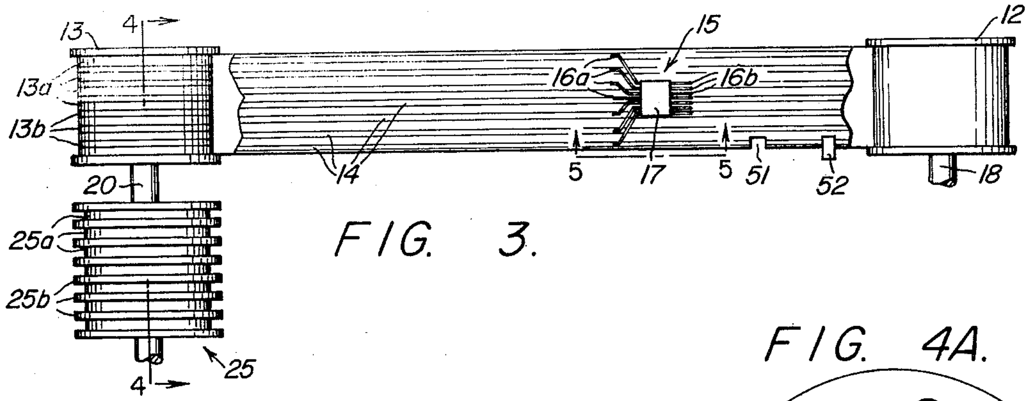
FIG. 3.
FIG. 4A.
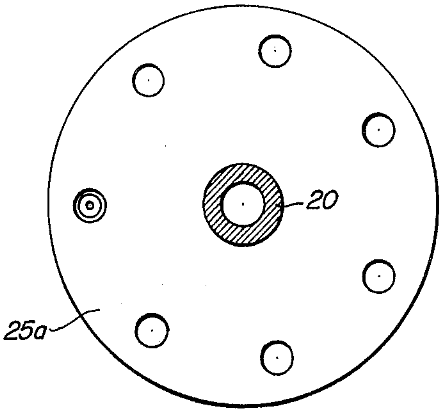
FIG. 4.
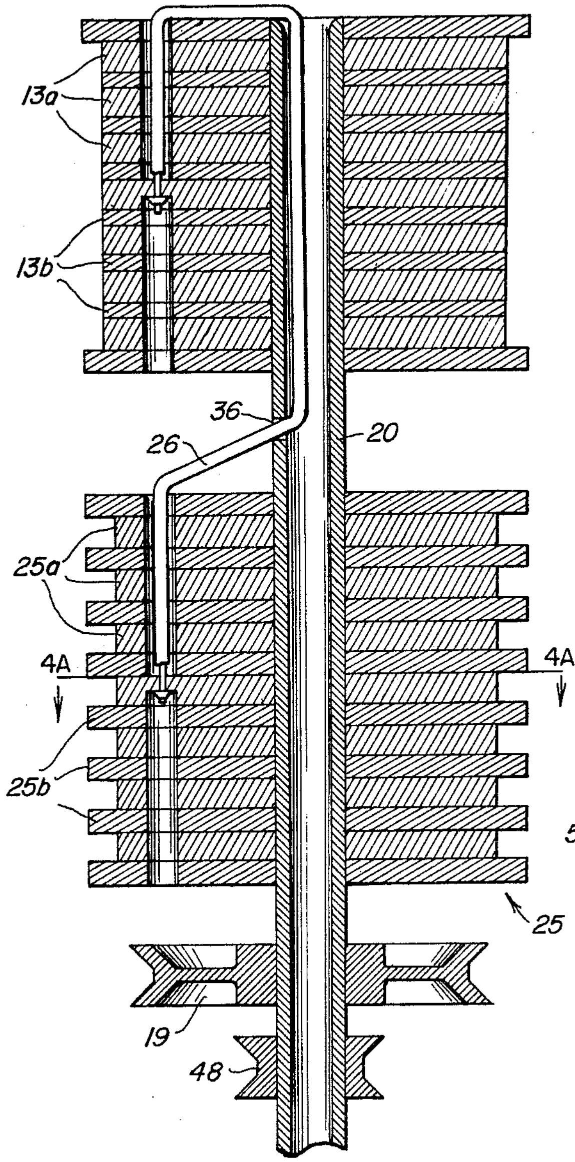
FIG. 5.
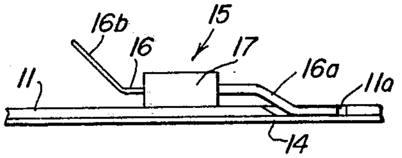
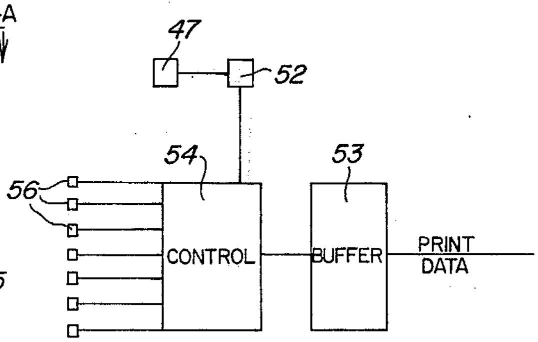
FIG. 6.

DOUBLE REVOLVING STYLUS ON CONTINUOUS BELT

BACKGROUND OF THE INVENTION

Most non-impact printers which use "burn-off imaging," i.e., burning of marks on aluminized paper by means of electrode arrays, use some form of reciprocating carriage. The carriage moves in one direction to print and in the opposite direction during carriage return. To increase printing speed, the carriage speed must be increased which causes increased dynamics problems and power dissipation.

In addition a reciprocating carriage requires complicated electrical and/or electronic systems for controlling speed, sensing margins, braking, and reversing carriage travel. Various mechanical gearing, clutching and electromechanical switching arrangements are also required to provide requisite control linkage between one or more motors and the carriage.

A large portion of the manufacturing cost of a printer is required for the print head carriage and its controls. A substantial simplification of carriage construction and its controls would provide a substantial reduction in the cost of a printer as well as a reduction in the problems associated with machine dynamics and other inherent maintenance problems related to use of complicated control arrangements.

The present invention contemplates a low cost, reliable and quiet stylus carriage arrangement for use in a printer which substantially reduces the cost thereof; and because of its simple construction and minimum of controls, greatly enhances the reliability of the printer as well as substantially reducing maintenance requirements.

The present invention contemplates a printer employing a continuously revolving endless belt having at least two sets of stylii or print heads attached thereto for moving each stylus over the paper. Each stylus comprises a plurality of wires formed at one end into a writing tip which contacts the electrically conductive paper as it is moved across the paper by the belt. The belt itself is made of an insulating material with a plurality of conductive strips disposed on the surface of the belt and extending around the outer periphery thereof. The stylus wires are electrically connected to respectively positioned conductive strips. The belt is disposed about a pair of spools, one of which is motor driven. The other spool may be spring loaded to provide belt tension. Current is supplied to the stylus via the motor-driven spool which is a commutator and a slip ring assembly in tandem with the commutator spool or by a brush assembly in contact with the conductive strips of the belt.

OBJECTS

It is an object of the present invention to provide a stylus carriage which increases printing speed by utilizing a plurality of print heads and eliminating the need for carriage return.

Another object of the present invention is to provide a stylus carriage of simple construction which substantially decreases the controls required by a conventional reciprocating stylus carriage.

A further object of the present invention is to provide a stylus carriage by which a plurality of print heads are sequentially moved over a print medium continuously.

Yet another object of the present invention is to provide a stylus carriage which requires no braking, stopping or carriage return controls and which uses a plurality of stylii each of which is sequentially brought into the print position in a continuous fashion.

Other objects and many of the attendant advantages of the present invention will become more apparent with reading the following description in conjunction with the accompanying drawings.

DESCRIPTION OF THE DRAWINGS

FIG. 3 is a front view of the stylus carriage of the present invention;

FIG. 4 is a sectional side view of the commutator spool and slip ring assembly taken through lines 4—4 of FIG. 3;

FIG. 4A is a top view of a typical conductive disk of the commutator spool or slip ring assembly;

FIG. 5 is a close-up view of a belt section including a stylus mounted thereon;

FIG. 6 is a block diagram showing the control circuit arrangement.

DESCRIPTION OF THE INVENTION

Figure 1:
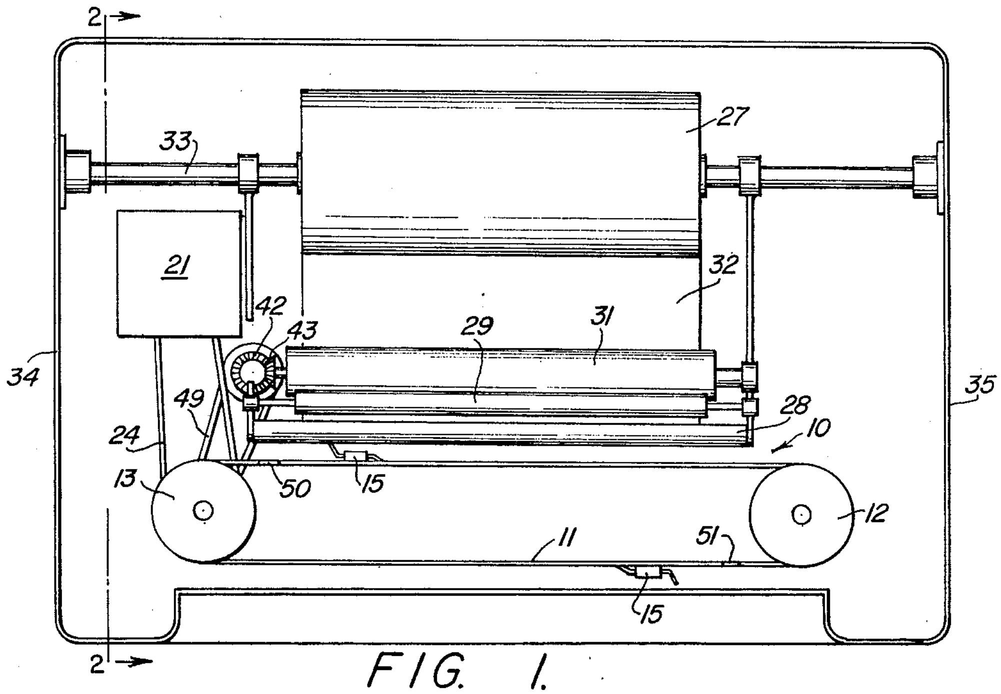
FIG. 1 is a top view of a portion of a printer including the stylus carriage of the present invention.

Referring to FIGS. 1 and 3, there is shown a stylus carriage 10. The stylus carriage comprises an endless belt 11 disposed about an idler spool 12 and a commutator spool 13.

The belt 11 is made of a plastic insulating material such as mylar. The belt 11 has a plurality of conductive strips 14 disposed on its inner surface. The conductive strips 14 are parallel to one another and continuous as seen in FIG. 3. In a preferred embodiment the number of conductive strips 14 used is seven. The conductive strips 14 may be made of any conductive foil-like material, e.g., copper foil. Each extends around the inner periphery of the belt 11 and is secured to the belt by any convenient mode of bonding, e.g., thermo-compression bonding.

Disposed on the outer surface of the belt 11 are two equally-spaced stylii 15.

Each stylus 15 comprises a plurality of wires 16, e.g., tungsten wires, equal in number to the number of conductive strips 14 which as mentioned above may be seven.

The middle portion of the wires 16 is embedded in a plastic block 17 which holds the wires 16 in equally-spaced paralled relationship. The block 17 is centrally located on the belt 11 and is secured thereto such as by plastic cement.

The ends 16a of the wires 16 are spread, and each is electrically connected to a respective conductive strip 14. The electrical connection may be made by any convenient method, e.g., soldering or electrosonic welding.

As seen in FIG. 5 the belt material is removed at minute areas 11a to expose a portion of each conductive strip 14 where an end *16a* of a wire 16 which has been straightened is electrically connected. This method of connection permits the surface presented by the inner surface of the belt 11 with the conductive strips to be relatively obstructionless to permit a further electrical connection via commutator spool 13 as will be explained more fully below.

The other ends 16*b* of the wires 16 form the writing tip of the stylus 15. The wires 16 at this end are of even length and closely-spaced. Each is bent upwardly at an angle to provide a writing tip or print head which is passed contiguously over a print medium during the print cycle.

The belt 11 is adapted to be driven via the commutator spool 13 with the idler spool 12 freely rotatable about a shaft 18.

Figure 2:
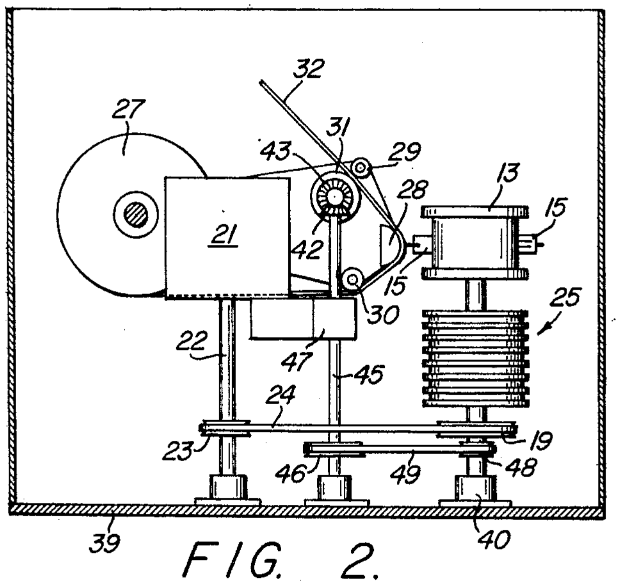
FIG. 2 is a left side view of the printer arrangement taken through lines 2—2 of FIG. 1.

The commutator spool 13 is driven via a pulley 19 on shaft 20. As seen in FIGS. 1 and 2, a motor 21 has a shaft 22 with a pulley 23 disposed thereon. A drive belt 24 extended between pulleys 19 and 23 transmits motive power to shaft 20 and drives the belt 11 via the commutator spool 13.

The commutator spool 13 and a slip ring assembly 25 secured for rotation on shaft 20 and the conductive strips 14 provide the means for individually energizing the wires 16 for printing.

As seen in FIG. 4 the commutator spool 13 comprises a plurality of conductive disks 13*a* separated by insulative disks 13*b* on a spool form 13*c*, part of which is shaft 20. The number of conductive disks 13*a* is equal to the number of conductive strips 14 on the belt 11 which as aforesaid is seven in a practical embodiment. In such a case the number of insulative disks 13*b* is eight. In addition the spool form 13*c* is made of insulative material. The spool form is secured to the upper end of shaft 20 as by force fitting.

The spool 13 is flanged so that the spool ends act as guides for the belt 11. The spacing between conductive disks 13*a* is such that the circumferential surface of each is aligned with and forms a continuous electrical connection to the conductive strips 14 on the belt 11 during movement of the belt 11 between the spools 12 and 13.

The slip ring assembly 25 is similar in construction to the commutator spool 13. It comprises seven conductive disks 25*a* and eight insulative disks 25*b*. The disks 25*a* and 25*b* may be held together by bolt or other means to form an integral structure and secured to the lower portion of the shaft 20 as by force fitting via center holes in the disks 25*a* and 25*b*. It should be noted that the center holes of disks 25*a* must be larger than 25*b* to avoid short with shaft 20.

The outside diameter of the insulative disks 25*b* is somewhat greater than that of the conductive disks 25*a*. Thus, the circumferential surfaces of the conductive disks 25*a* are recessed to form grooves wherein brush contacts may be guided.

Each conductive disk 25*a* of the slip ring assembly 25 is electrically connected to a selected one of the conductive disks 13*a* of the commutator spool 13.

FIG. 4 and 4A illustrate a typical manner in which one such electrical connection may be made.

Each of the disks 13*a* in both the commutator spool 13 and the slip ring assembly 25 has seven holes equally spaced about the periphery. In each conductive disk one of these holes is counter-sunk. The countersunk hole in each conductive disk is rotationally displaced by one seventh of a revolution from the next adjacent conductive disk in the slip ring assembly 25 and similarly displaced in the commutator spool 13.

The electrical connection is made between countersunk holes of the conductive disks in the commutator spool 13 and the slip ring assembly 25. As illustrates in FIG. 4 a wire 26 is connected between the fourth disk from the top of the commutator spool 13 and the fourth disk from the top of the slip ring assembly. The connection to each disk is made at the countersunk holes in each disk. This may be accomplished by passing the wire through the hole and using a terminal connector 28 of any convenient type or a touch of solder to make the connection within the countersink of the disk.

As seen in FIG. 4A each countersunk hole in a disk has a smaller hole drilled through the disk to accommodate the connector wires.

As may be seen the wire passes through the holes in the top three of the conductive disks in both the commutator spool 13 and the slip ring assembly. The shaft 20 which is hollow provides a path for the wire 26 via a hole 36 in the wall thereof. The shaft may have seven holes to accommodate the required seven wires, or alternatively all seven wires may be passed through a single hole in the wall of shaft 20.

In addition to wire 26, there are six other wires (not shown) connecting individual conductive disks of the commutator spool 13 and slip ring assembly 25. Thus, each conductive disk 25*a* of the slip ring assembly 25 is connected to a selected conductive disk 13*a* of the commutator spool 13 which, in turn, has a conductive disk 13*a* in electrical contact with an individual conductive strip 14 on the belt 11. Since each conductive strip 14 is connected to a wire of the stylus 15, it can be seen that each of the wires 16 has a separate conductive path to a selected conductive disk 25*a* of the slip ring assembly 25 which is adapted to be energized in accordance with data to be printed.

FIGS. 1 and 2 show the stylus carriage of the present invention within the environment of a printer. For purposes of brevity only those elements within the printer required in the combination of the present invention are shown.

As previously mentioned, the motor 21 provides the drive to the stylus carriage 10 via pulleys 19 and 23 and pulley belt 24. The motor 21 may be a small, inexpensive A.C. or D.C. type motor without the necessity of being bi-directional as would be the case where the stylus carriage must be returned after each print cycle.

A paper supply roll 27 is disposed on a shaft 33. The shaft 33 is anchored for rotation at both ends in side frames of the printer represented by reference numerals 34 and 35. A pair of guide rollers 29 and 30 each disposed on a shaft anchored for rotation in side frames 34 and 35 are used to guide the paper 32 in front of the platen 28. As best seen in FIG. 1, the stylus carriage belt 10 and more particularly the stylii 15 disposed on belt 11 are positioned relative to the platen 28 such that the stylii 15 each pass contiguously across the paper 32 in printing a line of data. As will be explained more fully hereinbelow, as one of the stylii 15 completes a print cycle, the paper 32 is advanced a line so that the next oncoming stylii 15 move into the print position at the next line to be printed. Obviously, more than two stylii may be used by appropriate adjustment of the length of belt 11 and placement of the other parts of the present invention.

As previously pointed out the stylus carriage belt of the present invention is capable of use in any printer where the printing technology requires contact between the print medium and the print head. In a practical embodiment, the print technology used is the "image-burn technique" wherein the print paper is aluminized and the stylii wires which form the print head burn a matrix of alphanumeric patterns onto the paper as the stylii pass through a print line.

If such an image-burn technique is used, means must be provided for grounding the paper for circuit completion. This may be accomplished by grounding the platen 28 or by provision of a paper grounding roller 29 which as shown in FIG. 2 is the paper guide roller used to guide the paper 32 to a paper drive roller 38. Thus, in addition to grounding the paper grounding roller 31 creates friction with the paper drive roller 31 so that when the paper 32 is advanced a line, the paper drive roller 38 is capable of gripping the paper for the advance.

The paper drive roller 31 is also mounted on a shaft anchored in side frames 34 and 35 and may have an outer surface of hard rubber or similar material to enhance gripping of the paper. The motor 21 is anchored to the base 39 in any convenient manner. The stylus carriage belt 10 including the commutator spool 13 and slip ring assembly 25 may be anchored to the printer frame in any convenient manner. In the drawing it is shown as being supported by bearing support 40 in the position shown.

The paper drive roller 31 has a gear 42 fixed to one end of its shaft. Gear 42 meshes with a gear 43 supported at the end of a shaft 44. A shaft 45 has a pulley 46 fixed near its end. A clutch 47 interconnects shafts 44 and 45. The shaft 20 of the commutator spool has a pulley 48 fixed thereon. A belt 49 is disposed between pulleys 46 and 48 and causes the paper to be advanced one line by rotating the paper drive roller 31 an increment of one line via gears 42 and 43, shaft 44, clutch 47 and shaft 45. When the motor 21 is running, the pulleys 48 and 46 cause shaft 45 to be continuously rotating. When a print line is complete, the clutch 47 is momentarily energized to supply power to the shaft 44 for moving the paper one line via paper drive roller 31.

The belt 11 has two equally-spaced slots 50 and 51 on the edge thereof. A photodetector circuit 52 which may comprise a light source and a light detector is fixed relative to the belt 11 and provides a signal each time a slot is detected. The photodetector 52 may be fixed to the frame in any convenient manner (not shown). This arrangement of a photodetector and slots may be termed a left-margin sensor whereby each time a stylus 15 reaches a predetermined position prior to its actual print position, the photodetector 52 provides a signal which is used to energize a clutch 47 and cause the paper to be advanced one line. In addition, the signal may also be used to inform the electronics of the system to provide one line of print data to the stylus.

While the electronics for converting print data into signals for printing by means of the stylus carriage form no part of the present invention, for purposes of completeness, FIG. 6 broadly outlines the manner in which this is done. It should be noted that the electronics and logic for receiving output data from a processor or processor storage buffer and converting it into appropriate signals to be used by a printer is well known in the art. FIG. 6 shows a buffer or memory-storage device 53 which is adapted to receive data print information as for example from a computer processor and store it temporarily. The buffer 53 is shown as having an output to a control 54 which on receipt of a signal from a photodetector 52 (left margin) to which it is shown connected, begins energizing the stylus 15 according to the data stored in the buffer 53 in an appropriate manner. The slip ring terminals collectively are identified by reference numeral 55. Each of the terminals 55 has a brush 56 connected thereto which is positioned in the slots formed by the insulative disk **25*b* of the slip ring assembly 25 in rubbing relationship to the circumferential surfaces of the conductive disks 13*a*. Through the circuitry previously described, the stylus 15 is thus provided with the data to be printed. It should be noted that alternate means of energizing the conductive strips 14 of stylus carriage belt 10 exist. For example, brushes directly contacting the strips 14 of belt 10** may be used.

Other modifications of the present invention are possible in the light of the above description, and the illustrations of the present invention set forth should not be construed as placing limitations on the present invention other than those limitations contained in the claims which follow.

What is claimed is:

1. A stylus carriage, comprising in combination;

an endless belt made of insulating material having a plurality of conductive paths disposed on the inner surface of said belt parallel to each other and to the direction of travel of said belt, each of said conductive paths comprising a strip of conductive material so spaced on said belt as to be electrically insulated from one another, a plurality of stylii, each of said stylii secured to said belt for travel therewith and comprising a plurality of conductive wires formed into a writing tip at one end and electrically connected at the other end to respective ones of said conductive paths, drive means for continuously driving said belt, said drive means comprising first and second spool means with said belt extended between said first and second spool means, motor means, pulley means connecting said motor means to said first spool means for rotating said first spool means to drive said belt, said second spool means mounted for free rotation, circuit means for establishing conductive paths to each of said stylii comprising, a plurality of conductive paths disposed about the outer surface of said first spool in electrical contact with said conductive paths on said belt, slip ring assembly means connected to said shaft means for rotation by said motor means, said slip ring assembly means having conductive paths disposed about its outer periphery, first means electrically interconnecting said conductive paths of said slip ring assembly means to respective ones of said conductive paths of said first spool means.

2. A stylus carriage according to claim 1 wherein;

said conductive paths on said first spool and said slip ring assembly comprise conductive disks having exposed circumferential surfaces, second means associated with said first spool means and said slip ring assembly means insulating each of said conductive disks from one another, each of said exposed circumferential surfaces of said conductive disks of said first spool means contacting one of said conductive paths disposed on said belt.

3. A stylus carriage according to claim 2 wherein;

said first means comprise a conductive wire connecting each of said conductive disks of said first spool means to a selected conductive disk of said slip ring assembly means, and said second means comprises an insulative disk disposed between adjacent conductive disks.

4. A stylus carriage according to claim 3 wherein the diameters of said insulative disks on said slip ring assembly are greater than the diameters of said conductive disks on said slip ring assembly means.

5. In a printer a stylus carriage arrangement for moving sequentially each one of a plurality of stylii into printing engagement with a print medium, comprising in combination;

an endless belt made of insulating material, a plurality of stylii secured to said belt, drive means for continuously driving said belt, a print medium having a flat surface disposed adjacent to said belt so that each of said stylii is brought in turn into printing engagement on said medium, circuit means for establishing conductive paths to each of said stylii, said drive means comprising, first and second spool means having axes disposed parallel to the flat surface of said print medium, said belt looped about said first and second spool means, motor means, pulley means connecting said motor means to said first spool means for driving said belt, said second spool means mounted for free rotation, said print means further comprising, a roll of paper, shaft means supporting said roll of paper in the printer, sensor means associated with said belt providing a signal each time one of said stylii completes a line of print, means connected between said motor means and said shaft means for advancing said paper one print line in response to said signal, each of said stylii comprising, a plurality of conductive wires formed at one end into a writing tip for contacting said paper and electrically connected to said circuit means at the other end, said circuit means comprising, a plurality of conductive paths disposed on said belt parallel to each other and to the direction of travel of said belt, each of said stylii secured to said belt for travel therewith with each of said conductive wires of said stylii electrically connected at said other end to respective ones of said conductive paths, said conductive paths each comprise a strip of conductive material disposed on the inner surface of said belt and so spaced on said belt as to be electrically insulated from one another, said circuit means further comprising, a plurality of conductive paths disposed about the outer surface of said first spool in electrical contact with said conductive paths on said belt, slip ring assembly means connected to said shaft means for rotation by said motor means, said slip ring assembly means having conductive paths disposed about its outer periphery, first means electrically interconnecting said conductive paths of said slip ring assembly means to respective ones of said conductive paths of said first spool means.

6. A printer according to claim 5 wherein;

said conductive paths of said first spool in said slip ring assembly comprise conductive disks having exposed circumferential surfaces, second means associated with said first spool means and said slip ring assembly means insulating each of said conductive disks from one another, each of said exposed circumferential surfaces of said conductive disks of said spool means contacting one of said conductive paths disposed on said belt.

7. A printer according to claim 6 wherein;

said first means comprises a conductive wire connecting each of said conductive disks of said first spool means to a selected conductive disk of said slip ring assembly means, and said second means comprises an insulative disk disposed between adjacent conductive disks.

8. A printer according to claim 7 wherein the diameters of said insulative disks on said slip ring assembly means are greater than the diameters of said conductive disks on said slip ring assembly means.

* * * * *